(12) United States Patent  
Guo et al.

(10) Patent No.: US 11,991,494 B2  
(45) Date of Patent: May 21, 2024

(54) KEYLESS CONTROL DEVICE AND EARPHONE

(71) Applicant: SHENZHEN GRANDSUN ELECTRONIC CO., LTD., Shenzhen (CN)

(72) Inventors: Shiwen Guo, Shenzhen (CN); Xin Yu, Shenzhen (CN); Hui Yang, Shenzhen (CN); Xuming He, Shenzhen (CN); Xianzhuo Qin, Shenzhen (CN); Ruiwen Shi, Shenzhen (CN); Haiquan Wu, Shenzhen (CN)

(73) Assignee: SHENZHEN GRANDSUN ELECTRONIC CO., LTD., Shenzhen (CN)

( * ) Notice: Subject to any disclaimer, the term of this patent is extended or adjusted under 35 U.S.C. 154(b) by 322 days.

(21) Appl. No.: 17/407,498

(22) Filed: Aug. 20, 2021

(65) Prior Publication Data

US 2021/0385568 A1  Dec. 9, 2021

Related U.S. Application Data

(63) Continuation-in-part of application No. PCT/CN2020/076018, filed on Feb. 20, 2020.

(30) Foreign Application Priority Data

Feb. 20, 2019 (CN) .......................... 201920215706.8

(51) Int. Cl.
*H04R 1/10* (2006.01)
*G01N 21/84* (2006.01)
(Continued)

(52) U.S. Cl.
CPC .......... *H04R 1/1041* (2013.01); *G01N 21/84* (2013.01); *G01P 15/12* (2013.01); *H04R 1/44* (2013.01); *H04R 2420/07* (2013.01); *H04W 4/80* (2018.02)

(58) Field of Classification Search
CPC .. H04R 1/1041; H04R 1/1016; H04R 1/1025; H04R 25/609; H04R 25/603
(Continued)

(56) References Cited

U.S. PATENT DOCUMENTS 10,687,113 B2 *  6/2020  Kegel ................. H04N 21/251  
10,687,853 B2 *  6/2020  Riccione ............ A61B 17/6433  
(Continued)

FOREIGN PATENT DOCUMENTS

CN  107708008 A  2/2018  
CN  109348352 A  2/2019  
(Continued)

*Primary Examiner* — Disler Paul  
(74) *Attorney, Agent, or Firm* — BENESCH, FRIEDLANDER, COPLAN & ARONOFF LLP (57) ABSTRACT

A keyless control device is provided, wherein the first infrared sensor module generates an infrared trigger signal when the earphone is in a wearing state; the Bluetooth controller generates enable signals according to the infrared trigger signal, and the left-ear infrared sensor module generates a first detection signal according to a first enable signal; the right-ear infrared sensor module generates a second detection signal according to the second enable signal; the left-ear acceleration sensor module generates a third detection signal according to the third enable signal when detecting that the left-ear component is knocked; the right-ear acceleration sensor module generates a fourth detection signal according to the fourth enable signal when detecting that the right-ear component is knocked; and (Continued)

finally, the Bluetooth controller performs the functions according to the detection signals.

12 Claims, 3 Drawing Sheets (51) Int. Cl.
*G01P 15/12* (2006.01)
*H04R 1/44* (2006.01)
*H04W 4/80* (2018.01)

(58) Field of Classification Search
USPC .................................................. 381/74, 322
See application file for complete search history.

(56) References Cited

U.S. PATENT DOCUMENTS

| | | | |
|---|---|---|---|
| 11,368,775 B1* | 6/2022 | Prelogar | H02J 7/00034 |
| 2011/0077056 A1 | 3/2011 | Park et al. | |
| 2014/0133669 A1* | 5/2014 | Klinghult | H04R 1/1041 |
| | | | 381/74 |
| 2015/0230019 A1 | 8/2015 | Sakai et al. | |
| 2017/0347178 A1 | 11/2017 | Masaki et al. | |
| 2018/0277123 A1 | 9/2018 | Bosen et al. | |

FOREIGN PATENT DOCUMENTS

| | | |
|---|---|---|
| CN | 209462561 U | 10/2019 |
| EP | 3041257 A1 | 7/2016 |

\* cited by examiner

KEYLESS CONTROL DEVICE AND EARPHONE

CROSS REFERENCE TO RELATED APPLICATION

This application is a continuation-in-part of International patent application No. PCT/CN2020/076018, which claims priority to Chinese patent application No. 201920215706.8 filed with CNIPA on Feb. 20, 2019, and entitled "keyless control device and earphone", the disclosure of which is incorporated herein by reference in entirety.

TECHNICAL FIELD

The present disclosure relates to the technical field of electronics, and particularly relates to a keyless control device and an earphone.

BACKGROUND

The statements herein merely provides background information related to the present disclosure, but do not necessarily constitute as the prior art. A conventional earphone includes a Bluetooth controller and multiple keys. These keys generate key signals according to user inputs, and the Bluetooth controller performs corresponding functions according to the key signals output by the different keys.

However, it is difficult to design a water-proof earphone and the control of the earphone is inconvenient due to the multiple keys.

Thus, it is difficult to design a waterproof earphone and the control of the traditional earphone is inconvenient due to the multiple keys provided by the traditional earphone.

SUMMARY

The present disclosure provides a keyless control device and an earphone, which aim to solve the technical problem that the traditional earphone has multiple keys, so that it is difficult to make a waterproof design and the control of the traditional earphone is inconvenient.

In order to solve the aforesaid technical problem, the technical solutions of the embodiments of the present disclosure are as follows:

a keyless control device is provided, the keyless control device is arranged in an earphone including a left-ear component and a right-ear component, and the keyless control device includes:
a left-ear infrared sensor module, which is connected with the Bluetooth controller and is configured to generate the first detection signal according to the first enable signal when detecting that the left-ear component is swept past by a user's hand;
a right-ear infrared sensor module, which is connected with the Bluetooth controller and is configured to generate the second detection signal according to the second enable signal when detecting that the right-ear component is swept past by the user's hand;
a left-ear acceleration sensor module, which is connected with the Bluetooth controller and is configured to generate the third detection signal according to the third enable signal when detecting that the left-ear component is knocked; and
a right-ear acceleration sensor module, which is connected with the Bluetooth controller and is configured to generate the fourth detection signal according to the fourth enable signal when detecting that the right-ear component is knocked.

In one embodiment, the keyless control device further includes:
a Hall sensor module, which is configured to generate a Hall trigger signal when detecting that the left-ear component and the right-ear component are not in an magnetic attraction state;
a first left-ear power circuit, which is connected with the Bluetooth controller, the first infrared sensor module, the left-ear infrared sensor module and the left-ear acceleration sensor module, and is configured to generate a first power for left-ear according to a first switch signal and a power supply, and supply the first power for left-ear to the first infrared sensor module, the left-ear infrared sensor module and the left-ear acceleration sensor module;
a second left-ear power circuit, which is connected with the Bluetooth controller, the first infrared sensor module, the left-ear infrared sensor module and the left-ear acceleration sensor module, and is configured to generate a second power for left-ear according to a second switch signal and the power supply, and supply the second power for left-ear to the first infrared sensor module, the left-ear infrared sensor module and the left-ear acceleration sensor module;
a first right-ear power circuit, which is connected with the Bluetooth controller, the first infrared sensor module, the right-ear infrared sensor module and the right-ear acceleration sensor module, and is configured to generate a first power for right-ear according to the first switch signal and the power supply, and supply the first power for right-ear to the first infrared sensor module, the right-ear infrared sensor module and the right-ear acceleration sensor module; and
a second right-ear power circuit, which is connected with the Bluetooth controller, the first infrared sensor module, the right-ear infrared sensor module and the right-ear acceleration sensor module, and is configured to generate a second power for right-ear according to the second switch signal and the power supply, and supply the second power for right-ear to the first infrared sensor module, the right-ear infrared sensor module and the right-ear acceleration sensor module;
the Bluetooth controller is configured to generate the first switch signal and the second switch signal according to the Hall trigger signal.

In one embodiment, each of the first left-ear power circuit and the first right-ear power circuit includes a first power circuit, and the first power circuit includes a first power conversion chip, a first capacitor and a second capacitor; wherein:
both a power input of the first power conversion chip and a first end of the first capacitor are connected with the power supply, a power output of the first power conversion chip and a first end of the second capacitor constitute an output terminal of the first power circuit together, an enable terminal of the first power conversion chip is a first switch signal input of the first power circuit, a GND terminal of the first power conversion chip, a second end of the first capacitor and a second end of the second capacitor are commonly grounded.

In one embodiment, each of the second left-ear power circuit and the second right-ear power circuit includes a second power circuit, and the second power circuit includes a second power conversion chip, a third capacitor and a fourth capacitor; wherein:

both a power input of the second power conversion chip and a first end of the third capacitor are connected with the power supply, a power output of the second power conversion chip and a first end of the fourth capacitor constitute an output terminal of the second power circuit together, an enable terminal of the second power conversion chip is a second switch signal input of the second power circuit, a GND terminal of the second power conversion chip, a second end of the third capacitor and a second end of the fourth capacitor are commonly grounded.

In one embodiment, the Hall sensor module includes a Hall sensor, a fifth capacitor, and a first resistor; wherein:

both a power terminal of the Hall sensor and a first end of the fifth capacitor are connected with the power supply, a data output of the Hall sensor is connected with a first end of the first resistor, a second end of the first resistor is an output of the Hall sensor module, and a GND terminal of the Hall sensor is grounded.

In one embodiment, the infrared trigger signal includes a first infrared trigger signal and a second infrared trigger signal, the first infrared sensor module includes:

a first wearable-state detection module configured to generate the first infrared trigger signal when detecting that the left-ear component is in a wearing state; and a second wearable-state detection module configured to generate the second infrared trigger signal when detecting that the right-ear component is in a wearing state.

In one embodiment, each of the first wearing state detection module, the second wearing state detection module, the left-ear infrared sensor module and the right-ear infrared sensor module includes an infrared detector, and the infrared detector includes an infrared sensor, a sixth capacitor, a second resistor, a third resistor and a fourth resistor; wherein:

an interrupt terminal of the infrared sensor and a first end of the second resistor constitute a control signal input of the infrared detector together, a power terminal of the infrared sensor and a first end of the sixth capacitor constitute a first power input of the infrared detector, a data terminal and a clock terminal of the infrared sensor, a first end of the third resistor and a first end of the fourth resistor constitute a detection signal output of the infrared detector together, a second end of the second resistor, a second end of the third resistor, and a second end of the fourth resistor constitute a second power input of the infrared detector together, a GND terminal of the infrared sensor and a second end of the sixth capacitor are commonly grounded.

In one embodiment, each of the left-ear acceleration sensor module and the right-ear acceleration sensor module includes an acceleration sensor circuit, and the acceleration sensor circuit includes an acceleration sensor, a seventh capacitor, a fifth resistor, a sixth resistor and a seventh resistor; wherein:

a first end of the acceleration sensor and a first end of the fifth resistor constitute a control signal input of the acceleration sensor circuit, a power terminal of the acceleration sensor and a first end of the seventh capacitor constitute a first power input of the acceleration sensor circuit together, a data terminal of the acceleration sensor, a first end of the sixth resistor and a first end of the seventh resistor constitute a detection signal output of the acceleration sensor circuit together, a second end of the fifth resistor, a second end of the sixth resistor, and a second end of the seventh resistor constitute a second power input of the acceleration sensor circuit together, and a GND terminal of the acceleration sensor and a second end of the seventh capacitor are commonly grounded.

In one embodiment, the Bluetooth controller includes a Bluetooth control chip, a Bluetooth RF chip, an antenna, a first inductor, a second inductor, an eighth capacitor, and a ninth capacitor; wherein:

the antenna and a first end of the first inductor are connected with a first end of the ninth capacitor, a second end of the first inductor and a first end of the eighth capacitor are connected with a signal input of the Bluetooth RF chip, and a signal output of the Bluetooth RF chip is connected with a first end of the second inductor, and a second end of the second inductor is connected with a Bluetooth signal input of the Bluetooth control chip, a system control terminal of the Bluetooth control chip is a Hall trigger signal input of the Bluetooth controller, and a first programmable data input/output of the Bluetooth control chip is a first switch signal output of the Bluetooth controller, a second programmable data input/output of the Bluetooth control chip is a second switch signal output of the Bluetooth controller, a third programmable data input/output and a fourth programmable data input/output are a wearing-state trigger signal output of the Bluetooth controller, a fifth programmable data input/output of the Bluetooth control chip is a first enable signal output of the Bluetooth controller, a sixth programmable data input/output of the Bluetooth control chip is a second enable signal output of the Bluetooth controller, a seventh programmable data input/output of the Bluetooth control chip is a third enable signal output of the Bluetooth controller, an eighth programmable data input/output of the Bluetooth control chip is a fourth enable signal output of the Bluetooth controller, a ninth programmable data input/output of the Bluetooth control chip and a tenth programmable data input/output of the Bluetooth control chip constitute a detection signal input of the Bluetooth controller together.

In one embodiment, functions corresponding to the first detection signal, the second detection signal, the third detection signal, and the fourth detection signal include the earphone's functions including playing, pausing, answering a phone call, hanging up the phone call, refusing the phone call, switching to a last song and switching to a next song.

In one embodiment, the Hall sensor module includes a Hall sensor and a magnet arranged in the left-ear component and the right-ear component respectively, and the Hall sensor is configured to generate the Hall trigger signal by means of detecting magnetic field of the magnet.

In one embodiment, whether the left-ear component and the right-ear component are in the magnetic attraction state are detected by the Hall sensor, when the left-ear component and the right-ear component are not in the magnetic attraction state, the first infrared sensor module, the Bluetooth controller is triggered to generate the first switch signal and the second switch signal so as to supply power to the first infrared sensor module, the left-ear infrared sensor module, the left-ear acceleration sensor module, the right-ear infrared sensor module and the right-ear acceleration sensor module; when the left-ear component and the right-ear component are in the magnetic attraction state, the first infrared sensor module, the left-ear infrared sensor module, the left-ear acceleration sensor module, the right-ear infrared sensor module and the right-ear acceleration sensor module, the first left-ear power circuit, the second left-ear power circuit, the first right-ear power circuit, and the second right-ear power circuit stop working.

An earphone is further provided in one embodiment of the present disclosure, the earphone includes the aforesaid keyless control device.

A keyless control device is further provided in one embodiment of the present disclosure, the keyless control device is arranged in an earphone, wherein the earphone includes a left-ear component and a right-ear component, and the keyless control device includes:
- a first infrared sensor module configured to generate an infrared trigger signal when the earphone is in a wearing state;
- a Bluetooth controller, which is connected with the first infrared sensor module and is configured to generate a fifth enable signal and a sixth enable signal according to the infrared trigger signal and perform corresponding functions according to the fifth detection signal and the sixth detection signal respectively;
- a left-ear sensor module, which is connected with the Bluetooth controller and is configured to generate a fifth detection signal according to the fifth enable signal, when detecting that the left-ear component is swept past by a user's hand; and
- a right-ear sensor module, which is connected with the Bluetooth controller and is configured to generate a sixth detection signal according to the sixth enable signal, when detecting that the right-ear component is swept past by the user's hand.

In one embodiment, the left-ear sensor module includes a left-ear infrared sensor module and a left-ear acceleration sensor module, and the right-ear sensor module includes a right-ear infrared sensor module and a right-ear acceleration sensor module.

In the embodiments of the present disclosure, the first infrared sensor module, the Bluetooth controller, the left-ear infrared sensor module, the right-ear infrared sensor module, the left-ear acceleration sensor module and the right-ear acceleration sensor module are included in the keyless earphone; the first infrared sensor module generates the infrared trigger signal when detecting that the earphone is in the wearing state; the Bluetooth controller generates the first enable signal, the second enable signal, the third enable signal and the fourth enable signal according to the infrared trigger signal, the left-ear infrared sensor module generates the first detection signal according to the first enable signal when detecting that the hand sweeps past the left-ear component; the right-ear infrared sensor module generates the second detection signal according to the second enable signal when detecting that than hand sweeps past the right-ear component; the left-ear acceleration sensor module generates the third detection signal according to the third enable signal when detecting that the left-ear component is knocked; the right-ear acceleration sensor module generates the fourth detection signal according to the fourth enable signal when detecting that the right-ear component is knocked, finally, the Bluetooth controller performs corresponding functions according to the first detection signal, the second detection signal, the third detection signal and the fourth detection signal; multiple functions of the earphone are controlled without keys, so that the waterproof design of the earphone is facilitated and the convenience of control of the earphone is improved.

BRIEF DESCRIPTION OF THE DRAWINGS

In order to describe the embodiments of the present disclosure more clearly, a brief introduction regarding the accompanying drawings that need to be used for describing the embodiments of the present disclosure or the prior art is given below; it is apparent that the accompanying drawings described herein are merely some embodiments of the present disclosure, the person of ordinary skill in the art may also acquire other drawings according to these drawings without paying creative labor.

DESCRIPTION OF THE EMBODIMENTS

In order to make the objective, the technical solutions and the advantageous effects of the present disclosure be clearer, the implementations modes of the present disclosure will be further described in detail below with reference to the drawings.

Figure 1:
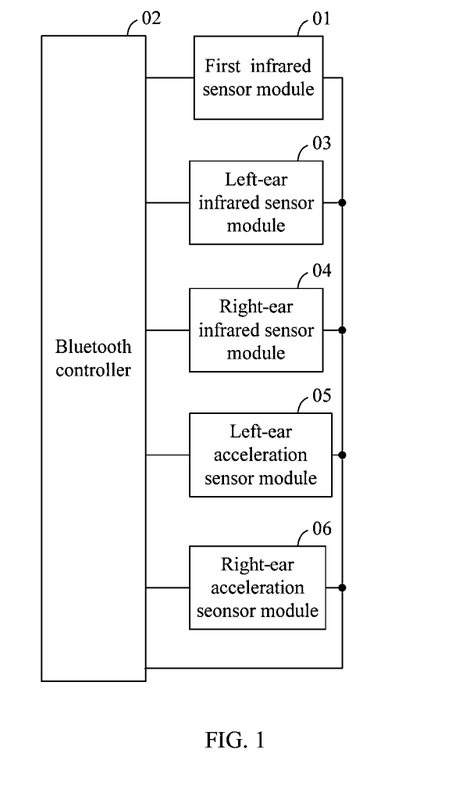
FIG. 1 illustrates one modular structural diagram of the keyless control device according to the embodiments of the present disclosure.

FIG. 1 illustrates a modular structure of a keyless control device according to one embodiment of the present disclosure. For the convenience of illustration, the part related with the embodiment of the present disclosure are merely shown, which are described in detail below:

The keyless control device is arranged in the earphone, the earphone includes a left-ear component and a right-ear component. The keyless control device includes a first infrared sensor module 01, a Bluetooth controller 02, a left-ear infrared sensor module 03, a right-ear infrared sensor module 04, a left-ear acceleration sensor module 05 and a right-ear acceleration sensor module 06.

Wherein the first infrared sensor module 01 is configured to generate an infrared trigger signal when detecting that the earphone is in a wearing state; the Bluetooth controller 02 is connected with the first infrared sensor module 01 and is configured to generate a first enable signal, a second enable signal, a third enable signal and a fourth enable signal according to the infrared trigger signal, and perform corresponding functions according to the first detection signal, the second detection signal, the third detection signal and the fourth detection signal; the left-ear infrared sensor module 03 is connected with the Bluetooth controller 02 and is configured to generate a first detection signal according to the first enable signal when detecting that the left-ear component is swept past by a user's hand; the right-ear infrared sensor module 04 is connected with the Bluetooth controller 02 and is configured to generate a second detection signal according to the second enable signal when detecting that the right-ear component is swept past by the user's hand; the left-ear acceleration sensor module 05 is connected with the Bluetooth controller 02 and is configured to generate a third detection signal according to the third enable signal when detecting that the left-ear component is knocked; the right-ear acceleration sensor module 06 is connected with the Bluetooth controller 02 and is configured to generate a fourth detection signal according to the fourth enable signal when detecting that the right-ear component is knocked.

Wherein the functions corresponding to the first detection signal, the second detection signal, the third detection signal, and the fourth detection signal can include playing, pausing, answering a phone call, hanging up a phone call, refusing a phone call, switching to the last song and switching to the next song.

Figure 2:
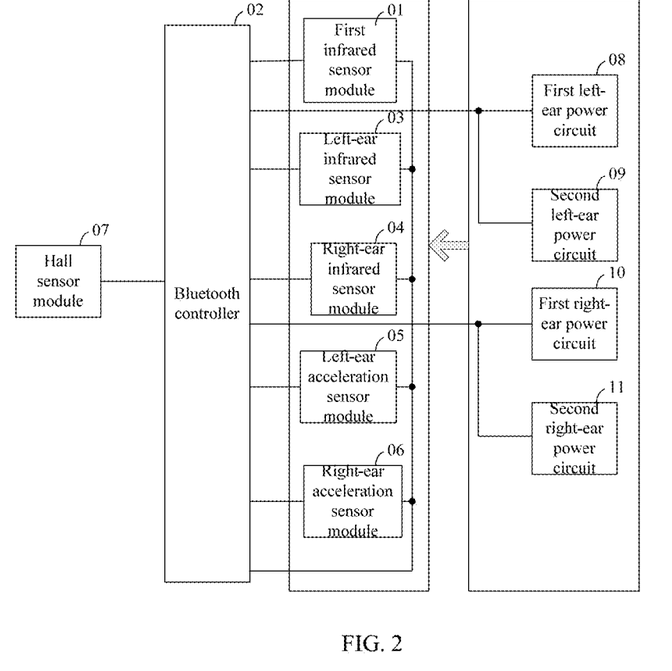
FIG. 2 illustrates another modular structural diagram of the keyless control device according to the embodiments of the present disclosure.

As shown in FIG. 2, the keyless control device further includes a Hall sensor module 07, a first left-ear power circuit 08, a second left-ear power circuit 09, a first right-ear power circuit 10, and a second right-ear power circuit 11.

The Hall sensor module 07 is configured to generate a Hall trigger signal when detecting that the left-ear component and the right-ear component are in the magnetic attraction state; the first left-ear power circuit 08 is connected with the Bluetooth controller 02, the first infrared sensor module 01, the left-ear infrared sensor module 03 and the left-ear acceleration sensor module 05, and is configured to generate a first power for left-ear according to the first switch signal and the power supply, and supply the left-ear power to the first infrared sensor module 01, the left-ear infrared sensor module 03 and the left-ear acceleration sensor module 05; the second left-ear power circuit 09 is connected with the Bluetooth controller 02, the first infrared sensor module 01, the left-ear infrared sensor module 03 and the left-ear acceleration sensor module 05, and is configured to generate a second left-ear power according to the second switch signal and the power supply, and supply the left-ear power to the first infrared sensor module 01, the left-ear infrared sensor module 03 and the left-ear acceleration sensor module 05; the first right-ear power circuit 10 is connected with the Bluetooth controller 02, the first infrared sensor module 01, the right-ear infrared sensor module 04 and the right-ear acceleration sensor module 06, and is configured to generate the first right-ear power according to the first switch signal and the power supply, and supply the right-ear power to the first infrared sensor module 01, the right-ear infrared sensor module 04 and the right-ear acceleration sensor module 06; the second right-ear power circuit 11 is connected with the Bluetooth controller 02, the first infrared sensor module 01, the right-ear infrared sensor module 04 and the right-ear acceleration sensor module 06, and is configured to generate a second right-ear power according to the second switch signal and the power supply, and supply the right-ear power to the first infrared sensor module 01, the right-ear infrared sensor module 04 and the right-ear acceleration sensor module 06; and the Bluetooth controller 02 is configured to generate the first switch signal and the second switch signal according to the Hall triggering signal.

The magnetic attraction state of the left-ear component and the right-ear component is detected through the Hall sensor, when the left-ear component and the right-ear component are not in the magnetic attraction state, the Bluetooth controller 02 is triggered to generate the first switch signal and the second switch signal so as to supply power to the first infrared sensor module 01, the left-ear infrared sensor module 01, the left-ear acceleration sensor module 05, the right-ear infrared sensor module 04 and the right-ear acceleration sensor module 06, so that when the left-ear component and the right-ear component are in the magnetic attraction state, the first infrared sensor module 01, the left-ear infrared sensor module 03, the left-ear acceleration sensor module 05, the right-ear infrared sensor module 04, the right-ear acceleration sensor module 06, the first left-ear power circuit 08, the second left-ear power circuit 09, the first right-ear power circuit 10 and the second right-ear power circuit 11 stop working so as to save electric energy.

Wherein the Hall sensor and the magnet are arranged in the left-ear component and the right-ear component, respectively, the Hall sensor generates a Hall trigger signal by detecting the magnetic field of the magnet.

The infrared trigger signal includes a first infrared trigger signal and a second infrared trigger signal, the first infrared sensor module 01 includes a first wearing-state detection module 011 and a second wearing-state detection module 012.

The first wearing-state detection module 011 is configured to generate the first infrared trigger signal, when detecting that the left-ear component is in the wearing state;

The second wearing-state detection module 012 is configured to generate the second infrared trigger signal, when detecting that the right-ear component is in the wearing state.

Wherein the first wearing-state detection module 011, the left-ear infrared sensor module 03 and the left-ear acceleration sensor module 05 are arranged in the left-ear component, the second wearing-state detection module 012, the right-ear infrared sensor module 04 and the right-ear acceleration sensor module 06 are arranged in the right-ear component.

The wearing states of the left-ear component and the right-ear component are detected by the first wearing-state detection module 011 and the second wearing-state detection module 012 respectively, so that the accuracy of detection of the wearing-state of the earphone is improved.

Figure 3:
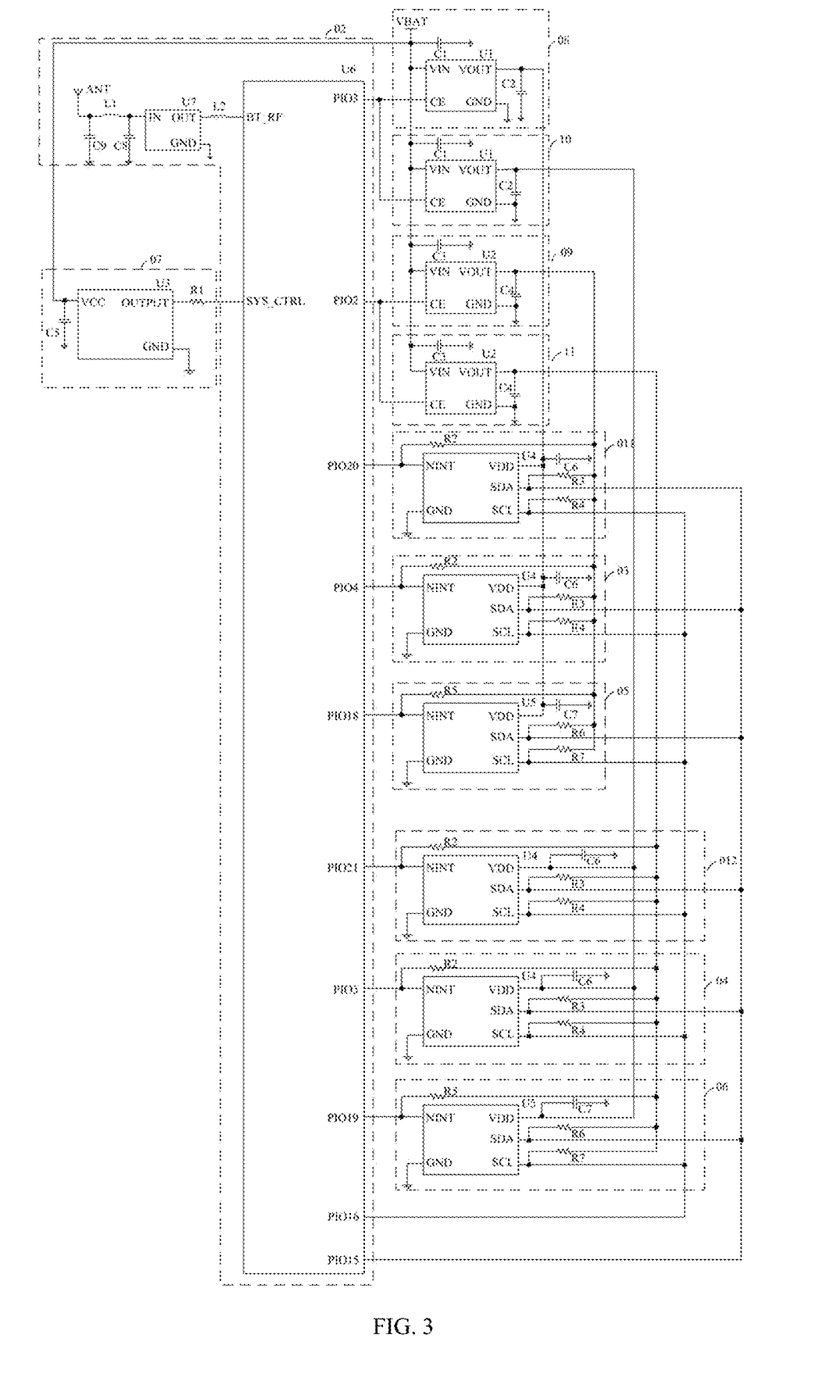
FIG. 3 illustrates an exemplary circuit diagram of the keyless control device according to the embodiments of the present disclosure.

FIG. 3 illustrates an exemplary circuitry topology of a keyless control device according to one embodiment of the present disclosure. For the convenience of illustration, the part related to the embodiment of the present disclosure is merely shown and is described in detail below:

Each of the first left-ear power circuit 08 and the first right-ear power circuit 10 includes a first power circuit, and the first power circuit includes a first power conversion chip U1, a first capacitor C1 and a second capacitor C2.

A power input terminal VIN of the first power conversion chip U1 and a first end of the first capacitor C1 are commonly connected to the power supply VBAT, a power output of the first power conversion chip U1 and a first end of the second capacitor C2 constitute an input of the first power circuit, an enable terminal CE of the first power conversion chip U1 is the first switch signal input of the first power circuit, a GND terminal of the first power conversion chip U1, a second end of the first capacitor C1, and a second end of the second capacitor C2 are commonly grounded.

Each of the second left-ear power circuit 09 and the second right-ear power circuit 11 includes a second power circuit, and the second power circuit includes a second power conversion chip U2, a third capacitor C3 and a fourth capacitor C4.

Wherein power input VIN of the second power conversion chip U2 and a first end of the third capacitor C3 are commonly connected to the power supply VBAT, a power output VOUT of the second power conversion chip U2 and a first end of the fourth capacitor C4 constitute an output of the second power circuit, an enable terminal CE of the second power conversion chip U2 is a second switch signal input of the second power circuit, a GND terminal of the second power conversion chip U2, a second end of the third capacitor C3, and a second end of the fourth capacitor C4 are commonly grounded.

The Hall sensor module 07 includes a Hall sensor U3, a fifth capacitor U5, and a first resistor R1.

A power terminal VCC of the Hall sensor U3 and a first end of the fifth capacitor C5 are commonly connected to the power supply VBAT, a data output OUTPUT of the Hall sensor U3 is connected to a first end of the first resistor R1, a second end of the first resistor R1 is the output of the Hall sensor module 07, and a GND terminal of the Hall sensor U3 is grounded.

Each of the first wearing-state detection module 011, the second wearing-state detection module 012, the left-ear infrared sensor module 03 and the right-ear infrared sensor module 04 includes an infrared detector. The infrared detector includes an infrared sensor U4, a sixth capacitor C6, a second resistor R2, a third resistor R3 and a fourth resistor R4.

An interruption terminal NINT of the infrared sensor U4 and a first end of the second resistor R2 constitute a control signal input of the infrared detector together, a power terminal VDD of the infrared sensor U4 and a first end of the sixth capacitor C6 constitute a first power input of the infrared detector together, a data terminal SDA of the infrared sensor U4, a clock terminal SCK of the infrared sensor U4, a first end of the third resistor R3 and a first end of the fourth resistor R4 constitute a detection signal output of the infrared detector together, a second end of the second resistor R2, a second end of the third resistor R3, and a second end of the fourth resistor R4 constitute a second power input of the infrared detector together, and a GND terminal of the infrared sensor U4 and a second end of the sixth capacitor C6 are commonly grounded.

Each of the left-ear acceleration sensor module 05 and the right-ear acceleration sensor module 06 includes an acceleration sensor circuit, the acceleration sensor circuit includes an acceleration sensor U5, a seventh capacitor C7, a fifth resistor R5, a sixth resistor R6, and a seventh resistor R7.

Wherein an interruption terminal NINT of the acceleration sensor U5 and a first end of the fifth resistor R5 constitute a control signal input of the acceleration sensor circuit together, a power terminal VDD of the acceleration sensor U5 and a first end of the seventh capacitor C7 constitute a first power input of the acceleration sensor circuit together, a data terminal SDA of the acceleration sensor U5, a first end of the sixth resistor R6 and a first end of the seventh resistor R7 constitute a detection signal output of the acceleration sensor circuit together, a second end of the fifth resistor R5, a second end of the sixth resistor R6, and a second end of the seventh resistor R7 constitute a second power input of the acceleration sensor circuit together, and a GND terminal of the acceleration sensor U5 and a second end of the seventh capacitor C7 are commonly grounded.

The Bluetooth controller 02 includes a Bluetooth control chip U6, a Bluetooth RF (Radio Frequency) chip U7, an antenna ANT, a first inductor L1, a second inductor L2, an eighth capacitor C8, and a ninth capacitor C9.

The antenna ANT is connected with a first end of the first inductor L1 and a first end of the ninth capacitor C9, a second end of the first inductor L1 and a first end of the eighth capacitor C8 are connected with a signal input IN of the Bluetooth RF chip U7, a signal output OUT of the Bluetooth RF chip U7 is connected with a first end of the second inductor L2, a second end of the second inductor L2 is connected with a Bluetooth signal input BT RF of the Bluetooth control chip U6, a system control terminal SYS_CTRL of the Bluetooth control chip U6 is the Hall trigger signal input of the Bluetooth controller 02, a first programmable data input/output (Input and Output) terminal PIO3 of the Bluetooth control chip U6 is the first switch signal output of the Bluetooth controller 02, a second programmable data input/output terminal PIO2 of the Bluetooth control chip U6 is the second switch signal output of the Bluetooth controller 02, a third programmable data input/output terminal PIO20 and a fourth programmable data input/output terminal PIO21 of the Bluetooth control chip U6 are the wearing-state trigger signal output of the Bluetooth controller 02, the fifth programmable data input/output terminal PIO4 of the Bluetooth control chip U6 is the first enable signal output of the Bluetooth controller 02, the sixth programmable data input output PIO5 of the Bluetooth control chip U6 is the second enable signal output of the Bluetooth controller 02, the seventh programmable data input output PIO18 of the Bluetooth control chip U6 is the third enable signal output of the Bluetooth controller 02, the eighth programmable data input/output terminal PIO19 of the Bluetooth control chip U6 is the fourth enable signal output of the Bluetooth controller 02, the ninth programmable data input/output terminal PIO16 of the Bluetooth control chip U6 and the tenth programmable data input output terminal PIO15 of the Bluetooth control chip U6 constitute the detection signal input of the Bluetooth controller 02 together.

What is shown in FIG. 3 is further illustrated below with reference to the working principle of the keyless control device.

In one embodiment, the Hall sensor U3 generates the Hall trigger signal and outputs the Hall trigger signal from the data output terminal of the Hall sensor U3 to the system control terminal SYS_Ctrl of the Bluetooth control chip U6 when detecting that the left-ear component and the right-ear component are not in the magnetic attraction state; the Bluetooth control chip U6 generates the first switch signal and the second switch signal according to the Hall trigger signal and outputs the first switch signal and the second switch signal through the first programmable data input/output terminal PIO3 of the Bluetooth control chip U6 and the second programmable data input/output terminal PIO of the Bluetooth control chip U6, respectively.

The first power conversion chip U1 in the first left-ear power circuit 08 generates the first power for left-ear according to the first switch signal and the power supply, and supply the first power for left-ear to the first infrared sensor module 01, the left-ear infrared sensor module 03, and the left-ear acceleration sensor module 05; the second power conversion chip U2 in the second left-ear power circuit 09 generates the second power for left-ear according to the second switch signal and the power supply, and supply the second power for left-ear to the first infrared sensor module 01, the left-ear infrared sensor module 03 and the left-ear acceleration sensor module 05; the first power conversion chip U1 in the first right-ear power circuit 10 generates the first power for right-ear according to the first switch signal and the power supply, and supply the first power for right-ear to the first infrared sensor module 01, the right-ear infrared sensor module 04 and the right-ear acceleration sensor module 06; the power conversion chip U2 in the second right-ear power circuit 11 generates the second power for right-ear according to the second switch signal and the power supply, and supply the second power for right-ear to the first infrared sensor module 01, the right-ear infrared sensor module 04, and the right-ear acceleration sensor module 06.

The infrared sensor U4 in the first wearing-state detection module 011 and the infrared sensor U4 in the second wearing-state detection module 012 generate infrared trigger signals and send the infrared trigger signals to the ninth programmable data input/output terminal PIO 16 and the tenth programmable data input/output terminal PIO 15 of the Bluetooth control chip U6 when detecting that the earphone is in the wearing state; the Bluetooth control chip U6 is configured to generate the first enable signal, the second enable signal, the third enable signal and the fourth enable signal according to the infrared trigger signals, and output these signals through a fifth programmable data input/output terminal PIO4, a sixth programmable data input/output terminal PIO5, a seventh programmable data input/output terminal PIO18, an eighth programmable data I/O terminal PIO19 of the Bluetooth control chip U6, respectively.

The infrared sensor U4 in the left-ear infrared sensor module 03 generates the first detection signal according to the first enable signal when detecting that the left-ear component is swept past by hand; the infrared sensor U4 in the right-ear infrared sensor module 04 generates the second detection signal according to the second enable signal when detecting that the right-ear component is swept past by hand; the acceleration sensor U5 in the left-ear acceleration sensor module generates the third detection signal according to the third enable signal when detecting that the left-ear component is knocked; the acceleration sensor U5 in the right-ear acceleration sensor module 06 generates the fourth detection signal according to the fourth enable signal when detecting that the right-ear component is knocked. The first detection signal, the second detection signal, the third detection signal, and the fourth detection signal are input in the ninth programmable data input/output terminal PIO16 and the tenth programmable data input/output terminal PIO 15 of the Bluetooth control chip U6, and the Bluetooth control chip U6 performs corresponding functions according to the first detection signal, the second detection signal, the third detection signal and the fourth detection signal.

In one embodiment of the present disclosure, an earphone is further provided. The earphone includes the keyless control device described above.

In this embodiment of the present disclosure, the first infrared sensor module, the Bluetooth controller, the left-ear infrared sensor module, the right-ear infrared sensor module, the left-ear acceleration sensor module and the right-ear acceleration sensor module are included in the keyless control device; the first infrared sensor module generates the infrared trigger signal when detecting that the earphone is in the wearing state; the Bluetooth controller generates the first enable signal, the second enable signal, the third enable signal and the fourth enable signal according to the infrared trigger signal, the left-ear infrared sensor module generates the first detection signal according to the first enable signal when detecting that the left-ear component is swept past by hand; the right-ear infrared sensor module generates the second detection signal according to the second enable signal when detecting that the right-ear component is swept past by hand; the left-ear acceleration sensor module generates the third detection signal according to the third enable signal when detecting that the left-ear component is knocked; the right-ear acceleration sensor module generates the fourth detection signal according to the fourth enable signal when detecting that the right-ear component is knocked; finally, the Bluetooth controller performs the corresponding functions according to the first detection signal, the second detection signal, the third detection signal and the fourth detection signal; multiple functions of the earphone are controlled without keys, so that a waterproof design of the earphone is facilitated and a convenience of control of the earphone is improved.

All modifications, equivalent replacements, and improvements which are made within the spirit and the principle of the present disclosure should all be included in the protection scope of the present disclosure.

What is claimed is:

1. A keyless control device, wherein the keyless control device is arranged in an earphone comprising a left-ear component and a right-ear component, and the keyless control device comprises:
   a first infrared sensor module, which is configured to generate an infrared trigger signal when the earphone is in a wearing state;
   a Bluetooth controller, which is connected with the first infrared sensor module and is configured to generate a first enable signal, a second enable signal, a third enable signal and a fourth enable signal according to the infrared trigger signal and perform functions corresponding to a first detection signal, a second detection signal, a third detection signal and a fourth detection signal;
   a left-ear infrared sensor module, which is connected with the Bluetooth controller and is configured to generate the first detection signal according to the first enable signal when detecting that the left-ear component is swept past by a user's hand;
   a right-ear infrared sensor module, which is connected with the Bluetooth controller and is configured to generate the second detection signal according to the second enable signal when detecting that the right-ear component is swept past by the user's hand;
   a left-ear acceleration sensor module, which is connected with the Bluetooth controller and is configured to generate the third detection signal according to the third enable signal when detecting that the left-ear component is knocked;
   a right-ear acceleration sensor module, which is connected with the Bluetooth controller and is configured to generate the fourth detection signal according to the fourth enable signal when detecting that the right-ear component is knocked;
   a Hall sensor module, which is configured to generate a Hall trigger signal when detecting that the left-ear component and the right-ear component are not in a magnetic attraction state;
   a first left-ear power circuit, which is connected with the Bluetooth controller, the first infrared sensor module, the left-ear infrared sensor module and the left-ear acceleration sensor module, and is configured to generate a first power for left-ear according to a first switch signal and a power supply, and supply the first power for left-ear to the first infrared sensor module, the left-ear infrared sensor module and the left-ear acceleration sensor module;
   a second left-ear power circuit, which is connected with the Bluetooth controller, the first infrared sensor module, the left-ear infrared sensor module and the left-ear acceleration sensor module, and is configured to generate a second power for left-ear according to a second switch signal and the power supply, and supply the second power for left-ear to the first infrared sensor module, the left-ear infrared sensor module and the left-ear acceleration sensor module;
   a first right-ear power circuit, which is connected with the Bluetooth controller, the first infrared sensor module, the right-ear infrared sensor module and the right-ear acceleration sensor module, and is configured to generate a first power for right-ear according to the first switch signal and the power supply, and supply the first power for right-ear to the first infrared sensor module, the right-ear infrared sensor module and the right-ear acceleration sensor module; and a second right-ear power circuit, which is connected with the Bluetooth controller, the first infrared sensor module, the right-ear infrared sensor module and the right-ear acceleration sensor module, and is configured to generate a second power for right-ear according to the second switch signal and the power supply, and supply the second power for right-ear to the first infrared sensor module, the right-ear infrared sensor module and the right-ear acceleration sensor module;

wherein the Bluetooth controller is configured to generate the first switch signal and the second switch signal according to the Hall trigger signal.

2. The keyless control device according to claim 1, wherein each of the first left-ear power circuit and the first right-ear power circuit comprises a first power circuit, and the first power circuit comprises a first power conversion chip, a first capacitor and a second capacitor; wherein: both a power input of the first power conversion chip and a first end of the first capacitor are connected with the power supply, a power output of the first power conversion chip and a first end of the second capacitor constitute an output terminal of the first power circuit together, an enable terminal of the first power conversion chip is a first switch signal input of the first power circuit, a GND terminal of the first power conversion chip, a second end of the first capacitor and a second end of the second capacitor are commonly grounded.

3. The keyless control device according to claim 1, wherein each of the second left-ear power circuit and the second right-ear power circuit comprises a second power circuit, and the second power circuit comprises a second power conversion chip, a third capacitor and a fourth capacitor; wherein: both a power input of the second power conversion chip and a first end of the third capacitor are connected with the power supply, a power output of the second power conversion chip and a first end of the fourth capacitor constitute an output terminal of the second power circuit together, an enable terminal of the second power conversion chip is a second switch signal input of the second power circuit, a GND terminal of the second power conversion chip, a second end of the third capacitor and a second end of the fourth capacitor are commonly grounded.

4. The keyless control device of claim 1, wherein the Hall sensor module comprises a Hall sensor, a fifth capacitor, and a first resistor; wherein: both a power terminal of the Hall sensor and a first end of the fifth capacitor are connected with the power supply, a data output of the Hall sensor is connected with a first end of the first resistor, a second end of the first resistor is an output of the Hall sensor module, and a GND terminal of the Hall sensor is grounded.

5. The keyless control device according to claim 1, wherein the infrared trigger signal comprises a first infrared trigger signal and a second infrared trigger signal, the first infrared sensor module comprises:

a first wearable-state detection module configured to generate the first infrared trigger signal when detecting that the left-ear component is in a wearing state; and a second wearable-state detection module configured to generate the second infrared trigger signal when detecting that the right-ear component is in a wearing state.

6. The keyless control device according to claim 5, wherein each of the first wearing state detection module, the second wearing state detection module, the left-ear infrared sensor module and the right-ear infrared sensor module comprises an infrared detector, and the infrared detector comprises an infrared sensor, a sixth capacitor, a second resistor, a third resistor and a fourth resistor; wherein:

an interrupt terminal of the infrared sensor and a first end of the second resistor constitute a control signal input of the infrared detector together, a power terminal of the infrared sensor and a first end of the sixth capacitor constitute a first power input of the infrared detector, a data terminal and a clock terminal of the infrared sensor, a first end of the third resistor and a first end of the fourth resistor constitute a detection signal output of the infrared detector together, a second end of the second resistor, a second end of the third resistor, and a second end of the fourth resistor constitute a second power input of the infrared detector together, a GND terminal of the infrared sensor and a second end of the sixth capacitor are commonly grounded.

7. The keyless control device according to claim 1, wherein each of the left-ear acceleration sensor module and the right-ear acceleration sensor module comprises an acceleration sensor circuit, and the acceleration sensor circuit comprises an acceleration sensor, a seventh capacitor, a fifth resistor, a sixth resistor and a seventh resistor; wherein:

a first end of the acceleration sensor and a first end of the fifth resistor constitute a control signal input of the acceleration sensor circuit, a power terminal of the acceleration sensor and a first end of the seventh capacitor constitute a first power input of the acceleration sensor circuit together, a data terminal of the acceleration sensor, a first end of the sixth resistor and a first end of the seventh resistor constitute a detection signal output of the acceleration sensor circuit together, a second end of the fifth resistor, a second end of the sixth resistor, and a second end of the seventh resistor constitute a second power input of the acceleration sensor circuit together, and a GND terminal of the acceleration sensor and a second end of the seventh capacitor are commonly grounded.

8. The keyless control device according to claim 1, wherein the Bluetooth controller comprises a Bluetooth control chip, a Bluetooth RF chip, an antenna, a first inductor, a second inductor, an eighth capacitor, and a ninth capacitor; wherein:

the antenna and a first end of the first inductor are connected with a first end of the ninth capacitor, a second end of the first inductor and a first end of the eighth capacitor are connected with a signal input of the Bluetooth RF chip, and a signal output of the Bluetooth RF chip is connected with a first end of the second inductor, and a second end of the second inductor is connected with a Bluetooth signal input of the Bluetooth control chip, a system control terminal of the Bluetooth control chip is a Hall trigger signal input of the Bluetooth controller, and a first programmable data input/output of the Bluetooth control chip is a first switch signal output of the Bluetooth controller, a second programmable data input/output of the Bluetooth control chip is a second switch signal output of the Bluetooth controller, a third programmable data input/output and a fourth programmable data input/output are a wearing-state trigger signal output of the Bluetooth controller, a fifth programmable data input/output of the Bluetooth control chip is a first enable signal output of the Bluetooth controller, a sixth programmable data input/output of the Bluetooth control chip is a second enable signal output of the Bluetooth controller, a seventh programmable data input/output of the Bluetooth control chip is a third enable signal output of the Bluetooth controller, an eighth programmable data input/output of the Bluetooth control chip is a fourth enable signal output of the Bluetooth controller, a ninth programmable data input/output of the Bluetooth control chip and a tenth programmable data input/output of the Bluetooth control chip constitute a detection signal input of the Bluetooth controller together.

9. The keyless control device according to claim 1, wherein functions corresponding to the first detection signal, the second detection signal, the third detection signal, and the fourth detection signal comprise the earphone's functions comprising playing, pausing, answering a phone call, hanging up the phone call, refusing the phone call, switching to a last song and switching to a next song.

10. The keyless control device according to claim 1, wherein the Hall sensor module comprises a Hall sensor and a magnet arranged in the left-ear component and the right-ear component respectively, and the Hall sensor is configured to generate the Hall trigger signal by means of detecting magnetic field of the magnet.

11. The keyless control device according to claim 10, wherein whether the left-ear component and the right-ear component are in the magnetic attraction state are detected by the Hall sensor, when the left-ear component and the right-ear component are not in the magnetic attraction state; the first infrared sensor module, the Bluetooth controller is triggered to generate the first switch signal and the second switch signal so as to supply power to the first infrared sensor module, the left-ear infrared sensor module, the left-ear acceleration sensor module, the right-ear infrared sensor module and the right-ear acceleration sensor module; the first infrared sensor module, the left-ear infrared sensor module, the left-ear acceleration sensor module, the right-ear infrared sensor module and the right-ear acceleration sensor module, the first left-ear power circuit, the second left-ear power circuit, the first right-ear power circuit, and the second right-ear power circuit stop working when the left-ear component and the right-ear component are in the magnetic attraction state.

12. An earphone, comprising the keyless control device according to claim 1.

\* \* \* \* \*